Figure 1:
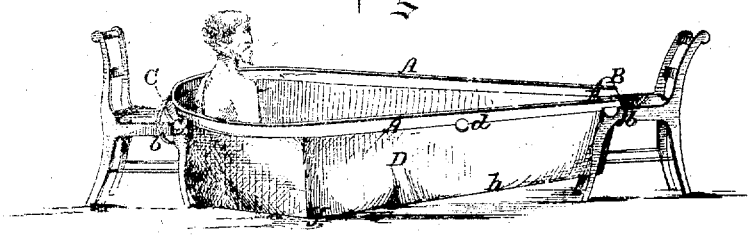

2 Sheets--Sheet 1.

E. J. KNOWLTON.

Portable Baths.

No. 4,949. Reissued June 18, 1872.

Attest;
S. W. Hamilton Johnson
Irving Wallace.

Inventor;
Ernest J. Knowlton
By his Attorney
A. E. H. Johnson

2 Sheets--Sheet 2.

E. J. KNOWLTON.

Portable Baths.

No. 4,949. Reissued June 18, 1872.

Attest;
W. Hamilton Johnson
Irving Wallace

Inventor;
E. J. Knowlton
By his Attorney
A. E. H. Johnson

UNITED STATES PATENT OFFICE.

ERNEST J. KNOWLTON, OF ANN ARBOR, MICHIGAN.

IMPROVEMENT IN PORTABLE BATHS.

Specification forming part of Letters Patent No. 100,297, dated March 1, 1870; reissue No. 4,949, dated June 18, 1872.

*To all whom it may concern:*

Be it known that I, ERNEST J. KNOWLTON, of Ann Arbor, in the county of Washtenaw and State of Michigan, have invented new Improvements in Portable Baths; and I do declare that the following is a true and accurate description thereof, reference being had to the accompanying drawing and to the letters of reference marked thereon, which form part of this specification.

In portable baths hitherto constructed, various plans have been adopted to obtain full (or submergent) baths of pliable material, as well as to produce a pendent bath of such material; but they have not been such as to meet the requirements either of invalids or for general use. Some have been made with inflated double air-filled sides; others held in place by a sort of basket frame-work; while a flexible rubber bath has been folded over side-bars and supported entirely upon the floor. In every such construction, however, as much water has been necessary as in metallic vessels, and all pendent or partially suspended baths have been attached to frames of equal width and depth, which must necessarily hold the pendent parts too far from each other to economize water; and the average width being the same, they cannot admit of the formation of two different widths of small baths from the same cavity. Moreover, where baths are suspended from frames having vertical end supports, and sometimes descending sides, these parts tend to obstruct the free action of the pendent sack, and it cannot be changed in different inclined positions. While these baths are incapable of affording a base point and an inclination of the foot portion with respect to the head and its support, they are designed for one form, size, and style of bath, and cannot be readily converted into different baths from one and the same cavity; nor has any attempt been made to construct a pliable pendent bath, having the capacity for changing its position or inclination with respect to its supports, and to be used with chairs to accomplish this desirable purpose.

My patent of January 28, 1868, as far as known to me, has the only approximation to a single flat-rim support for a pendent bath; but in that case the rim or frame is flexible, and is dependent, for support and connection, upon the bedstead and an attached leg, and my present improvements are designed to remedy the disadvantage attending such a construction, as well as all others.

The object of the invention which constitutes the subject-matter of this patent, is to accomplish the construction and production of a bath which shall be economical, and easily adaptable to a variety of uses, such as taking a full bath in a recumbent position, a sponge, a hip or sitz, a foot-bath, and also two small baths varying in capacity for different-sized children; and in each of these baths rendering them pleasant and entirely efficient with a comparatively small quantity of water, and which bath or baths may be used with great convenience and ease in the sick room, and for invalids whose diseases are from various causes. To these ends my invention consists, among others, of the following, features, viz.: First, of a bath of pliable material, pendent from a rigid flat frame. By the term "rigid flat frame," I simply mean a frame sufficiently firm for the various purposes hereafter designated, and the parts of which are practically free from unyielding vertical projections or posts. Secondly, of a flexible bath, pendent from rigid flat frame in such a manner that the said bath will afford a firm base in the bottom thereof near the shoulders or chest, while the limb portion thereof gradually inclines upward from that base support toward the foot, thereby enabling the person entering the bath to have an inflexible support and hold for the hands, and a solid base within the bath to stand on at will, and while bathing, to press the sack closely against the body by the weight within. Thirdly, combining, with a rigid, flat, open frame, projections for the purpose of affording proper means for the attachment of said bath to chairs or other suitable supports, or for resting thereon. Fourthly, contracting, dividing, or partitioning the cavity of a pliable pendent bath, whether for parts of the person, for the position of the person, or for adaptation for children, as may be required under different circumstances. Fifthly, in constructing a pendent bath of pliable material with that part of the frame to which the sack is attached, adaptable to sufficient inclination, from the foot upward, to form certain specific adaptations, as for a hip, sponge, or foot bath.

Sixthly, in bending one piece of timber in place of several parts joined together, to form a rigid flat frame for a bath of pliable material, thereby combining lightness, strength, and elegance. Seventhly, in making the rigid frame of a pendent pliable bath with a greater average width at one end than the other, for different widths of small baths. Eighthly, in combining or forming with such frame a spout or apron for the purpose of affording means for emptying the water from the bath when desired. Ninthly, in an arrangement of cords and means of attachment and adjustment of the bath. Tenthly, in the construction of a pendent bath having a rigid flat frame, adapted for use with chairs in such a manner that the frame and sack thereof can be adjusted with one end upon the floor, while the other end can be raised upon the chair-seat so as to afford a seat within the chair for the person in taking a foot or sponge bath. Eleventhly, in the combination of a pendent bath with the seat of one chair and the rounds or horizontal braces of another chair, in such a manner as to form a hip or sitz bath by means of a single transverse contraction of the sack near the middle thereof.

Figure 2:
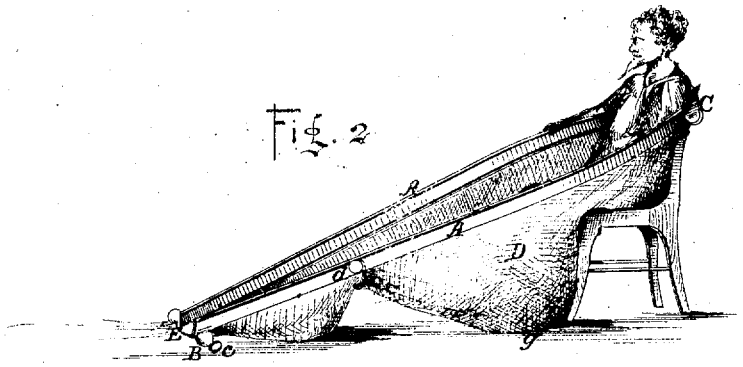
Figure 3:
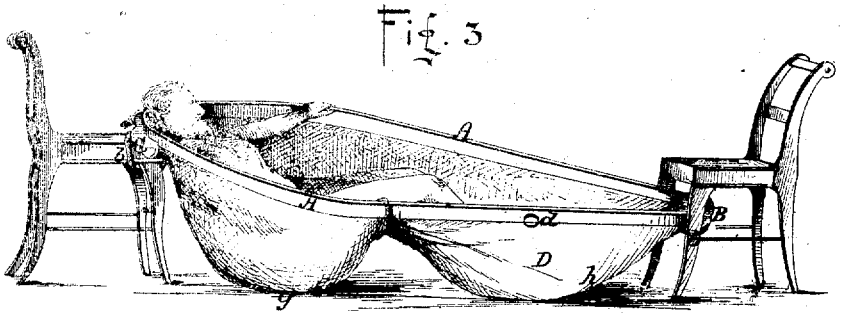
Figure 4:
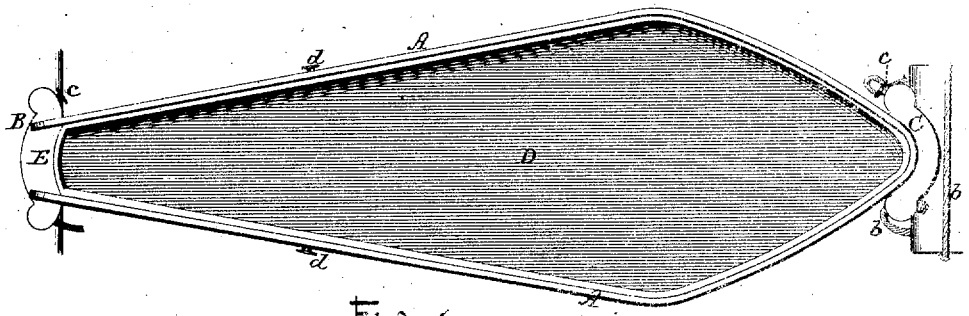
Figure 5:
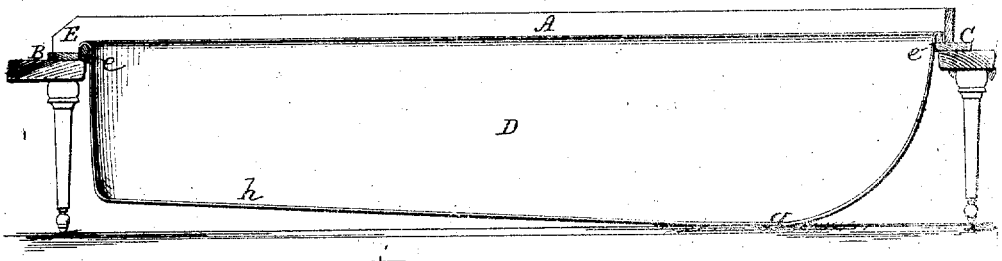

In the accompanying drawing, Figure 1 represents a view in perspective of a bath embracing my invention, shown in the position for a recumbent bath. Fig. 2 represents a similar view, the bath occupying the position when used for a foot or sponge bath. Fig. 3 represents a similar view, the bath being in the position when used as a hip or sitz bath. Fig. 4 represents a plan or top view of my improved bath; and Fig. 5, a vertical longitudinal section thereof, showing the base and inclined parts of the pendent or partially suspended sack with respect to the floor.

In the accompanying drawing, the rim A constitutes the frame of the bath. In the example shown it is made of a stick of tough timber, usually one inch thick, and two inches wide, and fourteen feet long, steamed and bent in the form of an ox-bow, or of a line conforming to the outline of the human body, with the ends of the bow projecting at the foot, secured about four inches apart, and connected by a cross-tie, B, matched and screwed onto the under edge of the ends of the bent piece, thereby completing the rim, and forming a suitable projection and wide base for resting on a chair or other temporary support, and at the same time serving as a spout or apron, E, for emptying the water out of the bath. This cross-tie should be about three-quarters of an inch thick, three inches wide, and fifteen inches long. A similar cross-tie or piece, C, is fastened in any convenient manner to the opposite end of the rim for resting on another chair. To one end of each of these cross-pieces B and C is fastened a strong cord, *b*, and to the other end is secured a button or small iron belaying-pin, *c*, by means of which and the cords *b* the whole is securely fastened to the chairs, as shown in the drawing. Opposite each other, and about two feet from the foot of the bath other buttons or iron belaying-pins *d* are firmly fastened to the rim or frame A, for the purposes hereinafter described.

The rim, being thus made, is then turned bottom upward, and while in that position the sack is then nailed to the inner and upper edge of the rim or frame under a round-edged cleat, *e*. The rim or frame is then righted, and the sack sustained so as not to be cut or worn out by the cleat. The sack D should, preferably, be made of strong white rubber-cloth, about seventy-six inches long, seventeen inches deep at the foot, twenty-two inches deep at the shoulders, and fifteen inches deep at the head, the top edge being straight, and the irregularities in depth, as described, being all on the bottom. This construction will give a base-point upon the floor, as shown at *g* in Fig. 5, and an upwardly-inclined foot or limb portion, *h*, whenever the ends of the rigid frame rest upon the seats of common house-chairs, and thus the base-point *g* is formed by the contact of the sack at the greatest depth with the floor, which has the very great advantage of affording a firm place for the bather to stand upright upon, and enabling him to control himself perfectly in getting in and out of the sack, using the rigid rim or frame as a support for his hands, while the bottom of the sack, from the base-point, inclines upward two or three inches, which is highly advantageous, in requiring much less water than a level-bottomed sack.

The convergent form of the frame is also very useful and advantageous, in connection with this unequal depth of sack, in facilitating the formation of the cavity into two separate and distinct bath-chambers or cavities, of varying depths and widths for different-sized children, by contracting the sack at right angles to its length, as shown in Figs. 2 and 3 of the drawing.

I do not wish to be confined arbitrarily to the exact sizes or forms I have given, but may vary the sizes or forms to suit circumstances.

Among the various baths which my invention will admit of the following may be mentioned, viz.: To form a submergent or recumbent bath for an adult, place the two ends of the rigid rim or frame on the front edge of house-chairs; pass the cords around the front legs; draw closely, and make fast to the belaying-pins *c* at the opposite side of the frame, as shown in Fig. 1. To form two small baths for children of different sizes, a cord or its equivalent is drawn around or across under the sack so as to divide the cavity transversely, and securely fastened to the belaying-pins or buttons *d*, thus contracting the water-space, and forming two separate baths of varying capacities. To form a sponge-bath, fasten the cross-tie, as in the small baths, and slip the head of the bath close up against the chair-back, to which it may be secured, if desired, and drop the foot to the floor. The upper end of the sack will then rest upon the chair-seat.

when the bather may sit thereon with feet in the sag of the sack, just in front of the chair, on the floor or base-point, and sponge from head to foot in the most comfortable position, while the water all gathers around the feet, and, therefore, in this form, it becomes a foot-bath, as shown in Fig. 2. To form a hip-bath from the structure or divided water cavity last described, raise the foot of the bath six or eight inches and secure it to a chair-round, the head end being upon the chair-seat, and sit in the sag of the sack, putting the feet into the sag in the foot of the bath, the bend of the knees conforming to the elevation of the sack; and, if need be, water of a different temperature may be put into the foot cavity.

I believe that no other form of bath hitherto known presents so many advantages as my invention, especially in the treatment of spinal and rheumatic complaints. For ease and comfort it cannot be surpassed. By the employment of pillows and other flexible fixtures under the sack any desirable modification and conformation of the cavity may be obtained, and the pain occasioned by the pressure of feeble and diseased parts against an unyielding substance avoided.

To empty the bath, set the foot of the rim or frame on a bucket, raise the head, and pour out the water. When empty, wipe, turn inside out, and hang up by the rim in a cool dry place.

It is obvious that legs may be hinged or otherwise attached to this bath, by means of which the chairs may be dispensed with, and that other supports applicable to the various conformations herein described may be improvised.

Having described my invention, I claim—

1. A bath of pliable material pendent from a rigid flat frame around the top edge only.

2. A bath of pliable material pendent from a frame, with that portion of the sack for the chest or shoulders touching the floor or a solid base, and the limb portion of the sack slightly inclined upward.

3. A pendent bath of pliable material, with less depth of sack near one end than near the other, or in the limb portion thereof than in the chest portion thereof, thereby reducing the cavity and economizing fluid.

4. A bath of pliable material pendent from a flat frame, with projections B for resting on or for attachment to chairs or other temporary supports.

5. The division of the cavity of a pliable bath by a single contraction of the sack or pliable material thereof, as described.

6. A bath of pliable material pendent from a frame, as described, or from any common mechanical structure, the parts of which are relatively so arranged that by simply drawing a cord around the same or elevating the sack near the middle thereof two different baths may be formed, varying in average width.

7. The arrangement of cords and means for their adjustable attachment by which partitions and adjustments may be attained in a pendent pliable bath, substantially as shown and described.

8. A pendent pliable bath in an inclined position, substantially as shown and described.

9. The practical combination of a pendent pliable bath with the common house-chair in forming specific adaptations—as for a full, a hip, or a sponge bath—substantially as shown and described.

10. A bath of pliable material pendent from a frame formed or sprung into shape as a hoop.

11. A spout or apron for the discharge of fluids projecting directly from or forming a part of the stiffening support of a pliable bath.

12. A change in the form of the cavity of a pendent pliable bath from an adaptation for one specific design to that of another—as from a full bath to a partial bath, or from a foot-bath to a hip-bath—by temporarily contracting or collapsing a part of the pliable material thereof, substantially as described.

13. A bath of a pliable material which affords a firm place to stand in the bottom thereof, and is so nearly suspended as to press the pliable parts closely against the sides of the person bathing by the weight of that person.

In testimony whereof I have hereunto set my hand in the presence of two subscribing witnesses this 20th day of May, A. D. 1872.

ERNEST J. KNOWLTON.

Witnesses:

A. E. H. JOHNSON,

J. W. HAMILTON JOHNSON.